United States Patent [19]
Yokota et al.

[11] Patent Number: 4,912,500
[45] Date of Patent: Mar. 27, 1990

[54] SINGLE LENS REFLEX CAMERA

[75] Inventors: Hideo Yokota, Kanagawa; Masatake Kato, Tokyo; Akihiko Shiraishi, Kanagawa; Makoto Sekita, Tokyo, all of Japan

[73] Assignee: Canon Kabushiki Kaisha, Tokyo, Japan

[21] Appl. No.: 296,877

[22] Filed: Jan. 12, 1989

Related U.S. Application Data

[63] Continuation of Ser. No. 910,399, Sep. 22, 1986, abandoned.

[30] Foreign Application Priority Data

Sep. 21, 1985 [JP] Japan ................... 60-209441
Nov. 14, 1985 [JP] Japan ................... 60-255603
Aug. 20, 1986 [JP] Japan ................... 61-196255

[51] Int. Cl.$^4$ ........................................ G03B 7/099
[52] U.S. Cl. ................................ 354/479; 354/152; 358/225
[58] Field of Search ............... 354/402, 407, 432, 476, 354/479, 152; 358/225, 227, 900

[56] References Cited

U.S. PATENT DOCUMENTS

| | | | |
|---|---|---|---|
| 3,280,714 | 10/1966 | Gunther et al. | 354/479 |
| 3,401,614 | 9/1968 | Gunther et al. | 354/479 |
| 3,429,246 | 2/1969 | Ebertz | 354/479 |
| 3,779,146 | 12/1973 | Trankner | 354/479 |
| 3,911,454 | 10/1975 | Ohmori | 354/152 |
| 4,171,155 | 10/1979 | Jyojiki et al. | 354/407 |
| 4,252,424 | 2/1981 | Imai et al. | 354/476 |
| 4,593,312 | 6/1986 | Yamasaki | 358/909 |
| 4,626,918 | 12/1986 | Morisawa | 358/225 |

Primary Examiner—Russell E. Adams
Attorney, Agent, or Firm—Fitzpatrick, Cella, Harper & Scinto

[57] ABSTRACT

For a single lens reflex camera in which an image bearing beam from the photographic objective is reflected by a movable mirror to the finder system, techniques are disclosed that the mirror is made half-reflective, and the transmitted light of the mirror is conducted by a supplementary optical member consisting of, at least, a prism fixedly secured (not movable relative) to the mirror toward an image sensor such as that of a focus detector positioned outside the optical axes of the objective and finder, that the movable mirror is made to take a quite different direction of movement from that to which the reflected beam from the mirror goes, and that as an image pickup device such as CCD is arranged on the optical axis of the objective and behind the movable mirror, the optical characteristics of optical members such as a filter positioned in front of the image pickup device are made equivalent to those of the supplementary optical member.

17 Claims, 5 Drawing Sheets

SINGLE LENS REFLEX CAMERA

This application is a continuation, of application Ser. No. 910,399 filed Sept. 22, 1986, now abandoned.

BACKGROUND OF THE INVENTION

1. Field of the Invention

This invention relates to single lens reflex cameras, and more particularly to a movable mirror with an auxiliary mirror suited to electronic still cameras.

2. Description of the Related Art

Of the single lens reflex cameras hitherto developed, Japanese Laid-Open Patent Application No. SHO 60-60611 discloses one in which as shown in FIG. 1, the movable mirror for reflecting the image bearing beam from the photographic objective to the finder system is provided with a half-reflective area in one surface thereof, and an auxiliary mirror is provided in axial alignment with the half-reflective area at such an angle therewith that the transmitted part of the image bearing beam through the half-reflective area is reflected to an automatic focus detector or a light meter positioned on the bottom of the mirror box. The general mechanism for operating such main and auxiliary mirrors is explained here by reference to FIG. 1 where 1 is a camera body. The main or tiltable mirror 2 when in viewing position reflects the image bearing beam upward to the finder system. A holding frame 3 for the mirror 2 is pivotal about a shaft 4. A stopper 5 limits the counterclockwise movement of the holding frame 3 to define the viewing position of the tiltable mirror 2. A central portion of the area of the tiltable mirror 2 is made half-reflective. Light emerging rearwardly of the central portion is reflected by an auxiliary mirror 6 tiltably provided on the tiltable mirror 2 to the automatic focus detector 7 on the bottom of the mirror box.

A holder 9 for the auxiliary mirror 6 is pivotally mounted on a shaft 10, and is urged by a spring (not shown) to turn in a direction indicated by arrow B. A stopper 11 on a camera casing limits the movement of the holder 9 in the direction B. A cam 12 is provided on an end portion of the holder 9 and arranged upon upward movement of the tiltable mirror 2 to turn the holder 9 in the opposite direction to the direction B as the cam 12 moves in contact with a pin (not shown) fixed to the camera body 1. In the non-viewing position, the holder 9 with the auxiliary mirror 6 is light-tightly folded on the holding frame 3.

This mirror arrangement for the focus detector shown in FIG. 1 is desirable when the photographic material is the so-called silver halide film, and when the format is 35 mm in size.

In a camera of smaller format such as a so-called electronic still camera, whose format has its two sides each equal to about a quarter of that of the format of the 35 mm single lens reflex camera, however, as its picture frame size decreases, the size of the tiltable mirror and auxiliary mirror is also decreased, and the size of the auxiliary mirror provided on the reduced-in-size movable mirror is reduced. Therefore, the requirement for the tolerance of the positions the movable mirror and auxiliary mirror take when they return from the non-viewing position should be extremely rigorous. In other words, the auxiliary mirror must be folded while the movable mirror retracts from the path of the image bearing beam. Thus, as the size of the movable mirror and the auxiliary mirror decreases, the difficulty of insuring high precision accuracy of their linking mechanism increases rapidly.

Generally, it is difficult to attain the high precision of a driving mechanism to precisely maintain the stability of the reflecting direction characteristic of the movable mirror or the auxiliary mirror. Therefore, where a focus detection or light measurement is effected using a light bundle reflected by the auxiliary mirror, it is very difficult to effect the focus detection or light measurement with high precision.

Also, in electronic still cameras and others, the picture frame size is a quarter of the 35 mm size, and the focal length of the photographic lens is about ¼ times shorter than 35 mm camera. The back focal distance also becomes shorter so that the distance from the lens mount to the image pickup device cannot be made long. Moreover, the tiltable mirror which is to be provided behind the photographic lens is positioned slightly away from the image pickup device such as CCD or the like. Further, for the image pickup device such as CCD or the like, various photographing optical members such as a quartz plate, an infrared rays cut filter, a cover glass and a color filter are arranged between the tiltable mirror and the image pickup device. For this reason, when the auxiliary mirror is arranged such that the image bearing beam, after reflection of the auxiliary mirror, emerges progressively nearer to the film than the point of incidence of it on the auxiliary mirror, as in the single lens reflex camera of FIG. 1 whose film size is 35 mm and silver halide is applied to the electronic still camera or the like, the above-described optical member such as the filters and the image pickup device become obstacles and, at the same time, the bottom portion of the mirror box becomes complicated. Because the bottom portion of the mirror box must be expanded, the camera as a whole becomes larger in size.

Also, on the assumption that, for example, automatic focus detection is performed by utilizing that part of the image bearing beam which has passed through the half-reflective area of the tiltable mirror in the form of the reflected light beam by the conventional type auxiliary mirror, then, since the length of the optical path from the tiltable mirror to the image pickup device becomes relatively long, when the length of the optical path from the tiltable mirror to the automatic focus detector is taken at the same value, it becomes very difficult in terms of space to arrange the focus detector without blocking any part of the image bearing beam to the image pickup device.

Further, the image forming system including the above-described various filters in between the photographic lens for the electronic camera and the image pickup device such as CCD or the like differs in optical performance from image forming systems that exclude optical members equivalent to these various filters from between the lens and, for example, the focus detector. Particularly when the focus detection is performed by measuring the degree of sharpness of an image of an object to be photographed, that difference gives rise to the drawback of lowering the accuracy of focus detection.

SUMMARY OF THE INVENTION

With the above-described drawbacks of the prior art in mind, a first object of the present invention is to provide a single lens reflex camera having an auxiliary mirror provided in a portion of the movable mirror to perform focus detection, light measurement or the like, in which the auxiliary reflector to be provided on the movable mirror is improved to always obtain stabilized reflection direction characteristics.

A second object is to improve the driving method of the movable mirror so that even in a single lens reflex camera of smaller picture frame size, stabilized reflection direction characteristics are obtained.

A third object is to improve the angle of reflection of an image bearing beam from the above-described auxiliary reflector in a sense that the space of the bottom portion of the mirror box is effectively utilized, thereby giving an advantage that the single lens reflex camera is provided with an automatic focus detecting device in the interior thereof, while still permitting simplification of the entire structure of the camera and minimization of the size of the camera to be achieved.

A fourth object is to provide a movable mirror device for a single lens reflex camera, the camera having, for example, a focus detecting system cooperating with an auxiliary reflector provided either behind, or in a portion of, the movable mirror, which enables part of the image bearing beam to be conducted to the focus detecting system with a high efficiency, while nevertheless permitting as high as imaging performance as that of the photographing system to be obtained easily, and, therefore, which is particularly suited to be used with the electronic camera.

To achieve the first object, in application to the single lens reflex camera, the auxiliary mirror is replaced by a reflection optical member arranged in fixedly secured relation to the movable mirror to remove the necessity of folding it as in the prior art and to conduct the image bearing to light receiving means.

To achieve the second object, moving means is provided so that when an exposure is made, the movable mirror is moved in another direction than that which approaches the finder system.

To achieve the third object, the angle of incidence of the image bearing beam on the reflection surface of the above-defined reflection optical member is made smaller than 45 degrees.

To achieve the fourth object, the optical characteristics of the above-defined optical member is made equivalent to the composite optical characteristic of the optical members such as the infrared ray cut filter and color separation filter for the image pickup device.

Other objects and features of the invention will become apparent from the following description of embodiments thereof by reference to the drawings.

DETAILED DESCRIPTION OF THE PREFERRED EMBODIMENTS

Figure 1:
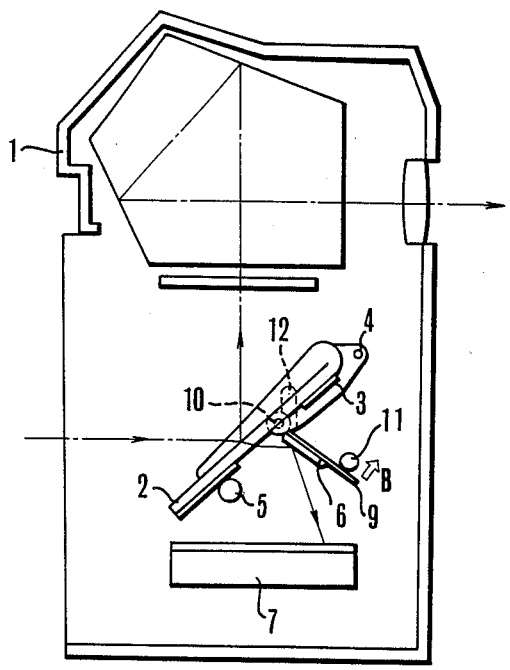
FIG. 1 is a schematic view of the conventional single lens reflex camera.
Figure 2:
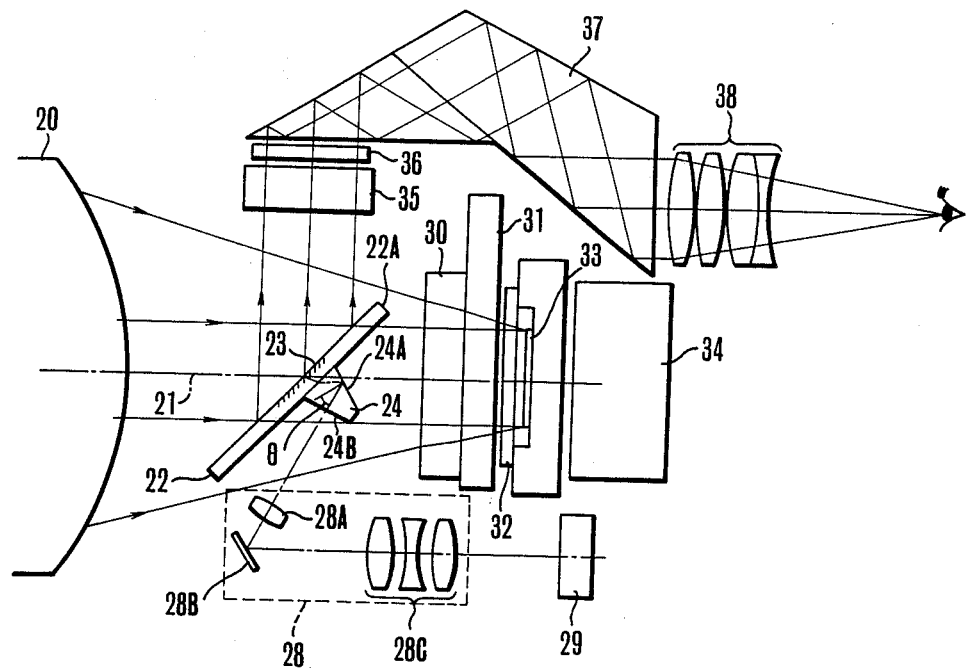
FIG. 2 is a schematic view of the optical system behind the photographic lens in a single lens reflex camera of the invention.

In FIG. 2 there is shown an embodiment of the invention applied to an electronic still camera. This camera has an optical system including a photographic lens 20 having an optical axis 21, a movable mirror 22 having a half-reflective surface 23 in a central portion of the area thereof, and an optical member such as a prism 24 having an auxiliary mirror. The optical member 24 is fixedly secured to the movable mirror 22. Thus, it is stationary relative to the movable mirror 22 but moves along with the movable mirror 22 in a direction perpendicular to the paper. An image bearing beam emerging from the photographic lens 20 transmits past the half-reflective area 23 of the movable mirror 22 to the optical member 24 and is reflected from the reflection surface 24A as the auxiliary mirror to a focus detector 28 positioned below the lowest marginal ray of the image bearing beam from the lens 20. Though FIGS. 1 and 2 are drawn to almost the same size of the parts, the movable 22 of FIG. 2 has lengths equal to about a quarter of those of the movable mirror 2 shown in FIG. 1.

In this embodiment, the optical member 24 is arranged so that the incident ray normal to the reflection surface 24A makes an angle of smaller than 45° with the optical axis 21 of the photographic lens 20, that is, the paraxial rays from the photographic lens 20 are reflected by the reflection surface 24A of the optical member 24 to a downward, forward direction away from an image pickup device to be described later, and so that the point of incidence of the central ray on the reflection surface 24A lies on the object side of the rear portion 22A of the movable mirror 22.

Note, the term "rear end portion 22A" herein used refers to the one portion of the movable mirror 22 which assumes the rearmost position when the movable mirror 22 is arranged in an inclined position.

Also, in this embodiment, the optical member 24 is formed to a prism unit of plastic or glass by molding techniques, and its exit surface 24B is so oriented that the central ray is perpendicular thereto. The use of such a shape of the prism unit 24 prevents the imaging performance of, for example, the secondary object image from being lowered when the focus detection is performed.

The focus detecting device 28 of this embodiment has a field lens 28A and a reflection mirror 28B by which the light beam from the optical member 24 is reflected to a pair of second-image forming lens groups positioned side by side in a direction perpendicular to the paper on which two images of an object are formed on respective CCD sensors 29 in a package. By detecting the phase difference of these two images, the focus state is determined. A first image of the object imaged by the photographic lens 20 is formed on the field lens 28A.

The optical members that follow the movable mirror 22 shown in FIG. 2 are an infrared cut filter or like optical low pass filter 30, a shutter unit 31, a protection glass plate 32 for an image pickup device 33 with its image receiving surface at a plane on which an image of the object is formed by the lens 20, a block 34 having a drive circuit for the image pickup device and a signal processing circuit, the parts 30 to 34 constituting a photographing system, an optical path correction plate 35, a focusing screen 36, a prism 37 and an eyepiece 38, the parts 35 to 38 constituting a finder system.

In the electronic type photographic camera using the solid state image pickup element as in the embodiment of the invention, because the image pickup element drive circuit and the signal processing circuit on the substrate and others are put in the rear of the image receiving surface, the distance from the image receiving surface to the back cover of the camera is relatively long.

Thus, in this embodiment, by arranging a mechanism for focus detection in the bottom portion of the mirror box and in a space beneath the image pickup device, the structure of the entire camera is not altered. Also, by effectively utilizing this space, the size of the entire camera is minimized.

In such a manner, in this embodiment, by arranging the sensor package 29 for focus detection with the effective use of the space below the image pickup device, the focus detector 28 does not protrude forward beyond the movable mirror 22. Also, by arranging the optical member 24 so that the point of incidence of the ray in the optical axis of the photographic lens 22 on the refection surface 22A of the optical member 24 lies on the object side of the rear end portion 22A of the movable mirror 22, mechanical interference with the optical low pass filter 30 due to the protrusion of the optical member 24 is avoided.

Also, since an accommodating space of almost the same size as the width of the optical member 24 is formed even in the direction perpendicular to the paper of FIG. 2, if the detector is arranged in this space, there will be no stress in this arrangement, so that without altering the size of the entire camera, a focus detector of very high accuracy can be achieved.

It should be noted that the CCD sensors for focus detection of this embodiment may be provided as a unit with the solid state image pickup element of picking up image, or a portion of the solid state image pickup element may be utilized as the sensor for focus detection by retracting the focus detector 28 so as not to block the optical path when picking up the image.

According to the foregoing embodiment, the movable mirror of the single lens reflex camera is provided with an optical member such as a prism in a prescribed position so that the light beam reflected from the optical member is utilized to permit effective use of the spaces on the bottom of the camera, minimization of the size of the optical member, and reduction of the load on the driving force of the movable mirror, when the focus detector is installed in the single lens reflex camera.

Also, since the reflection optical member is fixed to the movable mirror, or stationary relative to the movable mirror, the possibility of the occurrence of a loss of accuracy which would otherwise result from the dependent movement of the auxiliary mirror on the movable mirror of the prior art as the frequency of use increases can be removed.

Figure 3:
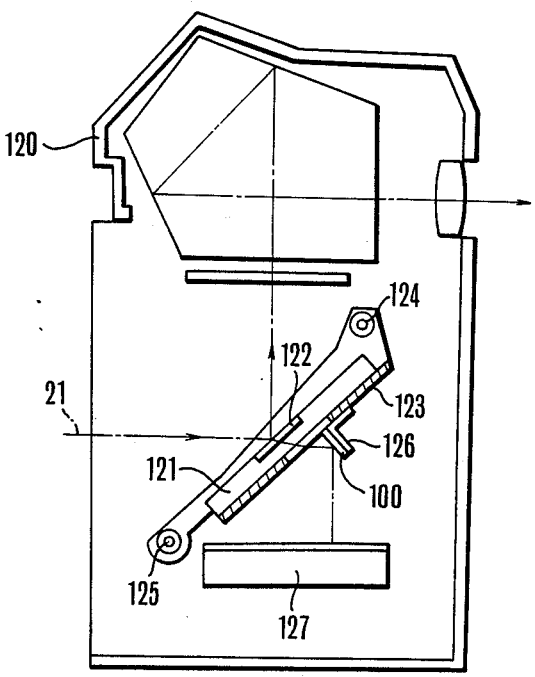
FIG. 3 is a schematic view of an embodiment of a drive mechanism for the optical system according to the present invention.

Next, as the optical member such as the prism is fixed to the movable mirror, an explanation will be provided about the operation of the movable mirror by reference to FIG. 3 where there is schematically shown a practical example of a moving mechanism for the movable mirror. The camera body 120 is assumed to have a photographic lens (not shown). A movable mirror 121 having a half-reflective area 122 at an almost central portion reflects an image bearing beam from the photographic lens to the finder system. A bracket 123 for holding the movable mirror 121 has a light pass opening in axial alignment with the half-reflective area 122. When an exposure is made, the holding bracket 123 is laterally moved along a pair of shafts 124 and 125 in a direction different from that toward the finder system, for example, the perpendicular direction to the paper unit, and the path of the image bearing beam of the photographic lens to the photographic image sensor is cleared. An optical member 100 having a reflection surface is fixed to the bracket 123 by means of a holding frame 126 therefor. 127 denotes an automatic focus detecting portion. In this embodiment, that part of the image bearing beam which has passed through the half-reflective area 122 travels through the opening provided in the bracket 123 to the optical member 100 and therefrom is reflected to the automatic focus detecting portion 127.

Figure 4A:
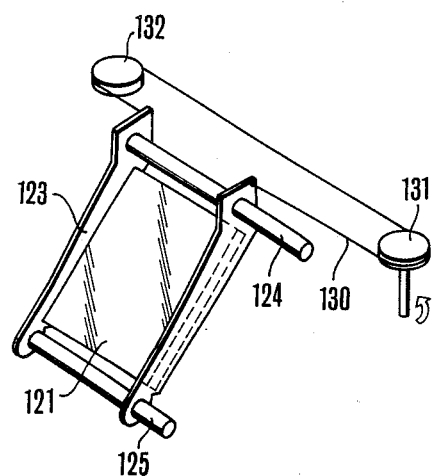
FIGS. 4(a) and 4(b) are perspective views of different examples of the drive mechanism of the invention.

FIG. 4(a) illustrates a drive mechanism for the movable mirror 121 according to the present invention, where the same reference numerals have been employed to denote the similar parts to those shown in FIG. 3. A wire 130 is connected at both ends thereof to the respective side walls of the bracket 123, and is trained between pulleys 131 and 132. As the pulley 131 is connected to a drive source (not shown), the wire 130 is driven to move, thereby the movable mirror 121 is retracted from the path of the image bearing beam. When the exposure is complete, it is again driven to return to the path of the image bearing beam.

Figure 4B:
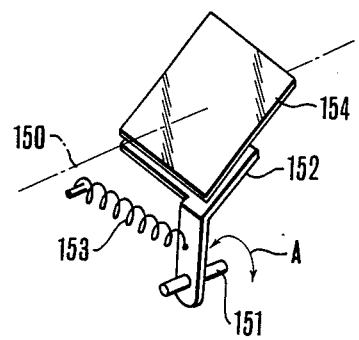

Next, FIG. 4(b) illustrates another embodiment where 150 is an optical axis of the photographic lens; 154 is a movable mirror; 152 is a member for holding the movable mirror 154. The movable mirror 154 turns about a pivot pin 151 fixed to the camera housing so that when an exposure is made, it retracts from the path of the image bearing beam, and when the exposure is complete, it is returned to the path by bias means 153 such as a spring connected to the holding member 152.

Figure 5:
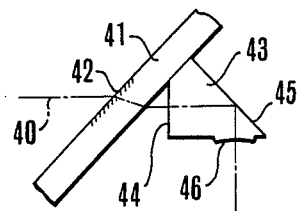
FIGS. 5 and 6 are side sectional views of two other examples of the optical member according to the invention.
Figure 6:
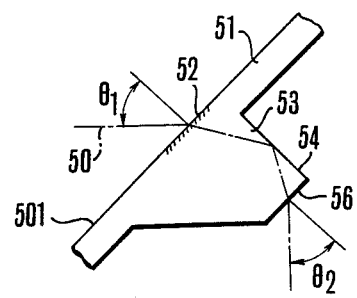

Other shapes of the optical member 100 according to the invention are depicted in FIGS. 5 and 6. In FIG. 5, 40 denotes an optical axis of the photographic lens (not shown); 41 is the movable mirror; and 42 is the half-reflective area. The optical member 43 is formed in the shape of a prism and is fixed to a portion of the movable mirror 41 either by an adhesive agent or mechanically. The optical member 43 has an entrance face 44 perpendicular to the optical axis 40, an inclined or reflection face 45 and an exit force 46 parallel to the optical axis 40. Note, the entrance face 44 and/or the exit face 46, instead of being in the shape of a plane, may be spherical so that refractive power has a value dependent on the refractive power arrangement of the optical system that follow.

Also, in FIG. 6, 50 is an optical axis of a photographic lens (not shown); 51 is a movable mirror; 52 is a half-reflective area; 53 is an optical member. In this embodiment, the movable mirror 51 and the optical member 53 are formed as a unit by molding plastic material or glass material. A reflection face 54 utilizes mirror reflection or total reflection. An exit face 56 is so oriented that the angle $\theta 1$ of incidence of an on-axis ray 50 normal to the entrance face 501 of the movable mirror 51 is almost equal to the angle $\theta 2$ of emergence of that ray with respect to the normal axis of the exit face 56; in other words, the entrace face 501 and the exit face 56 are almost parallel to each other. This enables the optical performance to be prevented from being lowering.

In the optical members shown in FIGS. 5 and 6, at least one optically almost parallel face to the exit face of the optical member is provided at the entrance surface of the movable mirror or in between the entrance surface of the movable mirror and the exit face of the optical member in order to prevent the optical performance of the light beam passing through the optical member from deteriorating.

Figure 7:
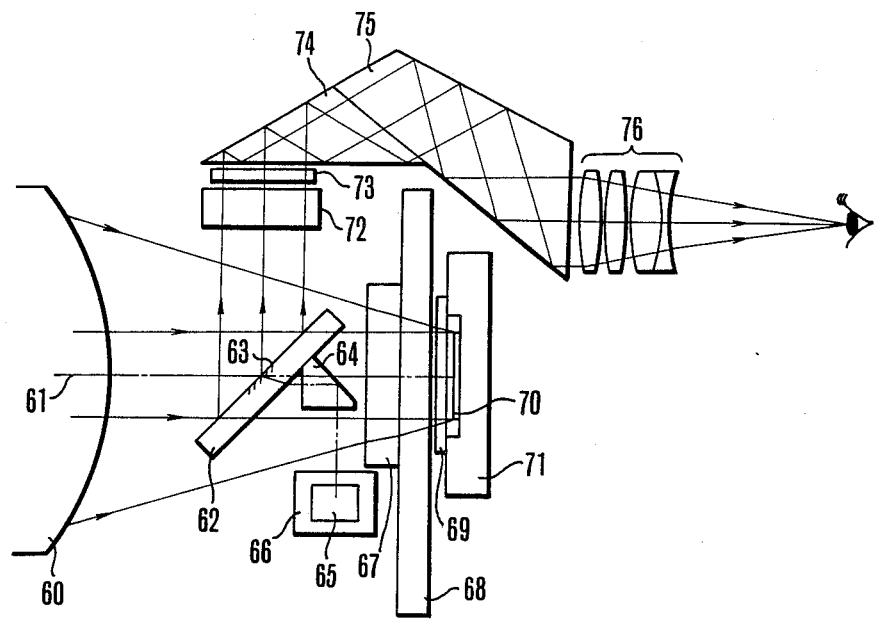
FIG. 7 is a schematic view of an electronic still camera to which the photographic system of the present invention is applied.

FIG. 7 is a schematic view of an optical system when the the invention is applied to the photographic system of the electronic still camera. In the same figure, 60 is a photographic lens with an optical axis 61; 62 is a movable mirror; 64 is an optical member movable in unison with the movable mirror 62. An image bearing beam from the photographic lens 60 passes through the half-reflective area 63 of the movable mirror 62 and is reflected by the optical member 64 to a reflection mirror 65 positioned in a lower part of the camera body. And, by the reflection mirror 65, the beam is reflected to a direction perpendicular to the paper, finally arriving at a focus detector 66.

In this embodiment, by moving the movable mirror 62 and the optical member 64 in a different direction from that in which the reflected light by the movable mirror 62 advances to the finder, for example, in the perpendicular direction to the paper, an advantage is produced that, as compared with the prior art where the movable mirror turns upward, that mirror with its associated optical member does not mutilate the effective beam path when the exposure is made, and the reflection direction characteristic of the movable mirror and optical member is maintained in an excellent state. Also, since, in this embodiment, the reflection mirror 65 is used for bending the beam from the optical member 64 laterally when it is conducted to the focus detector 66, another advantage is produced that when the photographic lens has the telecentric property, the focus detector can be arranged without mutilating its large effective beam region.

In FIG. 7, the photographing system further includes an optical low pass filter 67, a shutter unit 68, a protection glass plate 69, an image pickup device 70, and a package 71 for the image pickup device 70. The finder system further includes an optical path correction plate 72, a focusing screen 73, a prism 74, a roof type prism 75, and an eyepiece 76.

In this embodiment, the drive mechanism for the movable mirror may be not only of the type shown in FIG. 4(a) where a pair of guide shafts are used, but also of another type in which the bracket for holding the movable mirror is mounted on a pivot shaft perpendicular to the reflection surface.

It should be noted that that part of the beam which is to be reflected by the optical member is not only in the optical axis of the photographic lens but outside the optical axis. Also, in this embodiment, the focus detector may be replaced by a light meter or another device.

Even when the embodiment of the invention is applied to the electronic still camera whose movable mirror is particularly small, since the movable mirror and the optical member are unified, and, moreover, are made to move in the different direction from that toward the finder system, any part of the effective light beam to the image pickup device is not blocked, and a stabilized reflection direction characteristic is always obtained, when the movable mirror device is installed in the camera of the single lens reflex type. Also, since, as the prism is used as the optical member, the various aberrations of the prism are lessened by specifying the form of the prism, and an image of good quality can be formed on the focus detector, when the movable mirror device is installed in the camera of the single lens reflex type.

Figure 8:
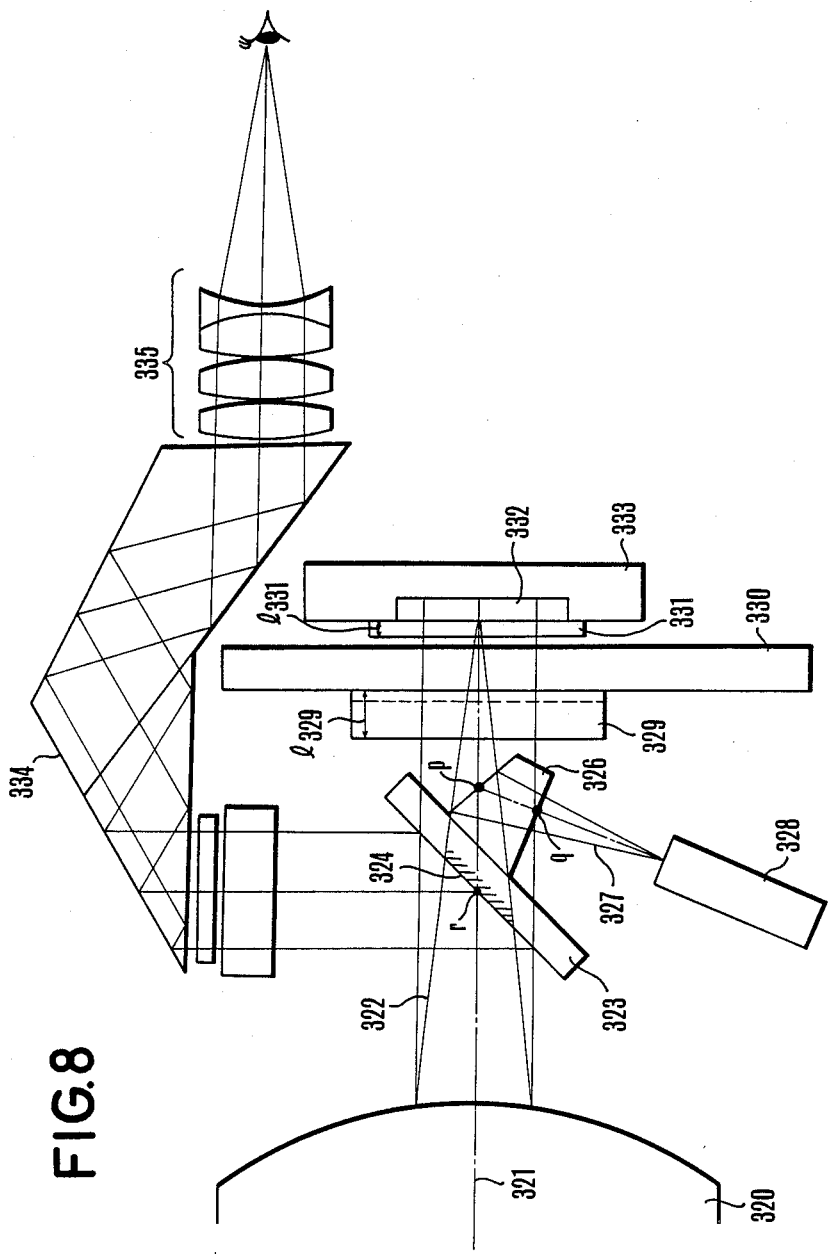
FIG. 8 is a schematic view of the optical system of another embodiment of the invention applied to an electronic camera.

Next, another embodiment will be explained in which the above-described aberrations and an optical path difference are taken into account. FIG. 8 is a schematic view of the optical system of another embodiment of the invention applied to the electronic camera. In the same figure, 320 is a photographic lens; 321 is an optical axis of the photographic lens 320; 322 is an image bearing beam; 323 is a movable mirror; 324 is a half-reflective area in a portion of the movable mirror 322; 326 is a reflection optical member constructed by applying the reflection face to a portion of a prism body, and fixed to the movable mirror 323. A focus detecting system 328 is provided on the bottom portion of the camera; 329 is a parallel flat plate such as quartz plate or infrared filter; 330 is a shutter unit; 331 is a cover glass; 332 is an image pickup device; 333 is a package for the image pickup device 322. 334 is a prism of the finder system; 335 is an eyepiece lens. In this embodiment, while the image bearing beam 322 is reflected by the movable mirror 323 to the finder system, part of the image bearing beam 322 is caused to pass through the half-reflective area 324, and to be conducted through the reflection optical member 326 to the focus detecting system 328. In this connection, the form of the prism body of the reflection optical member 326 is specified so that the length of the optical path from the half-reflective area 324 to the image pickup device 332 and the length of the optical path from the half-reflective area 324 through the reflection optical member 326 to the focus detecting system 328 are equal to each other. It should be noted that in FIG. 8, the optical members such as the prism and filter are exaggeratedly depicted. Therefore, because the distance from the half-reflective area 324 to the focus detecting system 328 is made longer by an amount corresponding to the length of the optical path of the prism body, it becomes easy to arrange the focus detecting system 328 outside the path of the image bearing beam toward the image pickup device as it is put on the bottom of the camera body.

Furthermore, in this embodiment, the prism body of the reflection optical member 326 that is the auxiliary mirror is designed so that it produces almost equal aberrations, particularly spherical aberration, to those produced from the combination of the photographing optical members 329 and 331, such as the quartz plate and infrared filter arranged in front of the image pickup device 332.

In this connection, it should be explained that taking the optical axis 321 as a reference, and denoting the point of incidence of the optical axis 321 on the movable mirror 323 by r, and by denoting the point of emergence of the optical axis 321 from the reflection optical member 326 by p, by making the refractive indices of the reflection optical member 326 and the movable mirror 323 which are almost equal to $N_1$, by denoting the point of emergence of it from the optical member 326 toward the focus detecting device 328 by q, by denoting the length of the optical path of the quartz plate 329 by $l_{329}$, by denoting the refractive index of the quartz plate 329 by $N_2$, by denoting the length of the optical path of the cover glass 331 by $l_{331}$, and the refractive index of the cover glass 331 by $N_3$, the following rule of design is set forth:

$$rP/N_1 + pq/N_1 = l_{329}/N_2 + i_{331}/N_3$$

The above-stated equation corrects aberrations particularly spherical aberration. Therefore, if the object image is not obtained through the optical members 329 and 331, the aberrational situation will differ. That is, the reduced length of the optical path of the movable mirror 323 and the reflection optical member 326 is made equal to the reduced length of the optical path of the optical members 329 and 331 and the others.

In such a manner, the reflection optical member 326 comprising the prism and others in this embodiment is constructed with the advantage that, because the image sharpness of the focus detecting system becomes equivalent to that of the photographing system, the optical performance of the focus detecting system is improved.

In the foregoing embodiments, as has been described above, by specifying the form of the reflection optical member arranged in rear of the movable mirror, it is made possible to increase the efficiency with which part of the image bearing beam is conducted to the focus detector arranged in the bottom portion of the camera, and further to insure that the object image on the focus detector is equivalent in the degree of sharpness to that on the image pickup device. This enables the accuracy of focus detection to be improved.

Also, in the foregoing embodiments, the light beam emerging from the auxiliary mirror are all conducted to the focus adjustment device, but the present invention is never confined to the focus adjustment device, and it may be applied to other light receiving elements such as the light meter, as a matter of course.

What is claimed is:

1. A single lens reflex camera comprising:
   (a) a finder system;
   (b) a movable mirror for conducting a photographing light to said finder system;
   (c) a reflection optical member stationary relative to said movable mirror and fixed thereto, said reflection optical member reflecting part of said photographing light outside of the path of said photographing light;
   (d) focus detecting means arranged outside the path of said photographing light, said focus detecting means receiving the light reflected by said reflection optical member;
   (e) image pick-up means for receiving said photographic light to produce a video signal; and
   (f) driving means for driving said movable mirror along a direction other than the direction toward or away from said finder system and other than the direction of travel of said photographing light before said photographing light is incident upon said movable mirror.

2. A camera according to claim 1, wherein said reflection optical member includes an entrace face at which said part of said photographing light enters, a reflection face for reflecting the entering light, and an exit face from which said reflected light emerges.

3. A camera according to claim 2, wherein the angle of incidence of said entering light on said reflection face is smaller than at least 45 degrees.

4. A camera according to claim 2, wherein said reflection optical member is a prism.

5. A camera according to claim 1, wherein said reflection optical member and said movable mirror are formed to a unit.

6. An electronic camera for photographing an object to be photographed by a photographing light beam from the object, comprising:
   (a) an image pickup device arranged in said photographing light beam and having an image receiving surface for receiving said photographing light beam;
   (b) a movable mirror arranged between said object and said image pickup device to pass part of said photographing light beam therethrough;
   (c) filter means used for said image pickup device and arranged between said movable mirror and said image receiving surface;
   (d) focus detecting means for producing a signal for controlling the focus of the camera; and
   (e) a reflection optical member secured on said mirror, said reflection optical member allowing the entry of the photographing light beam into said reflection optical member, reflection of the photographing light beam inside said reflection optical member, and exiting of the reflected photographing light beam from said reflection optical member to said focus detecting means, wherein said reflection optical member is constructed so that the reduced optical path length of said photographing light beam entering, reflecting and exiting an optical means composed of said movable mirror and said reflection optical member is substantially equal to the reduced optical path length of said photographing light beam passing through said filter means.

7. A camera according to claim 6, wherein said reflection optical member is a prism.

8. A camera according to claim 6, wherein said reflection optical member and said movable mirror are formed to a unit.

9. A camera according to claim 6, wherein said filter means is an infrared cut filter.

10. A camera according to claim 6, wherein said filter means is a protection glass for protecting said image pickup device.

11. A single lens reflex camera comprising:
    (a) an image pickup device for receiving a photographing light beam so as to produce video signals corresponding to an image of an object;
    (b) filter means for filtering the light beam incident upon said image pickup device, said filter means being located at the object side of said image pickup device;
    (c) a movable mirror allowing said photographing light beam to pass therethrough, said movable mirror being located at the object side of said filter;
    (d) an optical member allowing the entrance, the internal reflection, and the exiting of said photographing light beam, said optical member having a predetermined optical path length and being secured on said movable mirror; and
    (e) focus detecting means for receiving the light beam exiting out from said optical member so as to produce signals for adjusting the focus of said camera.

12. A single lens reflex camera according to claim 11, wherein said optical member is constructed so that the reduced optical path length of said photographing light beam entering, internally reflecting and exiting in and from an optical means composed of said movable mirror and said optical member is substantially equal to the reduced optical path length of said photographing light beam passing through said filter means.

13. A single lens reflex camera according to claim 11, wherein said optical member is a prism.

14. A single lens reflex camera according to claim 11, wherein said optical member and said movable mirror are in integral unit.

15. A single lens reflex camera according to claim 11, wherein said filter means is an infrared cut-off filter.

16. A single lens reflex camera according to claim 11, wherein said filter means comprises protection glass for protecting said image pickup device.

17. A single lens reflex camera according to claim 11, wherein said filter means is a low pass filter.

* * * * *

UNITED STATES PATENT AND TRADEMARK OFFICE
CERTIFICATE OF CORRECTION

PATENT NO. : 4,912,500  Page 1 of 2
DATED : March 27, 1990
INVENTOR(S) : Hideo YOKOTA It is certified that error appears in the above-identified patent and that said Letters Patent is hereby corrected as shown below:

COLUMN 2:

Line 14, "shorter than" should read --shorter than a--.

COLUMN 3:

Line 24, "as" (second occurrence) should read --an--.

Line 34, "bearing" should read --bearing beam--.

COLUMN 5:

Line 24, "surface 22A" should read --Surface 24A--.

Line 47, "spaces" should read --space--.

COLUMN 9:

Line 5, "aberration" should read --aberrations--.

UNITED STATES PATENT AND TRADEMARK OFFICE
CERTIFICATE OF CORRECTION

PATENT NO. : 4,912,500

DATED : March 27, 1990

INVENTOR(S) : Hideo Yokota

It is certified that error appears in the above-identified patent and that said Letters Patent is hereby corrected as shown below:

COLUMN 11:

Line 7, "in" should read --an--.

Signed and Sealed this

Eighteenth Day of February, 1992

Attest:

HARRY F. MANBECK, JR.

*Attesting Officer*      *Commissioner of Patents and Trademarks*